July 20, 1954
I. L. ASHKENAS
2,684,215
STICK FORCE MECHANISM
Filed Aug. 29, 1949
3 Sheets-Sheet 2
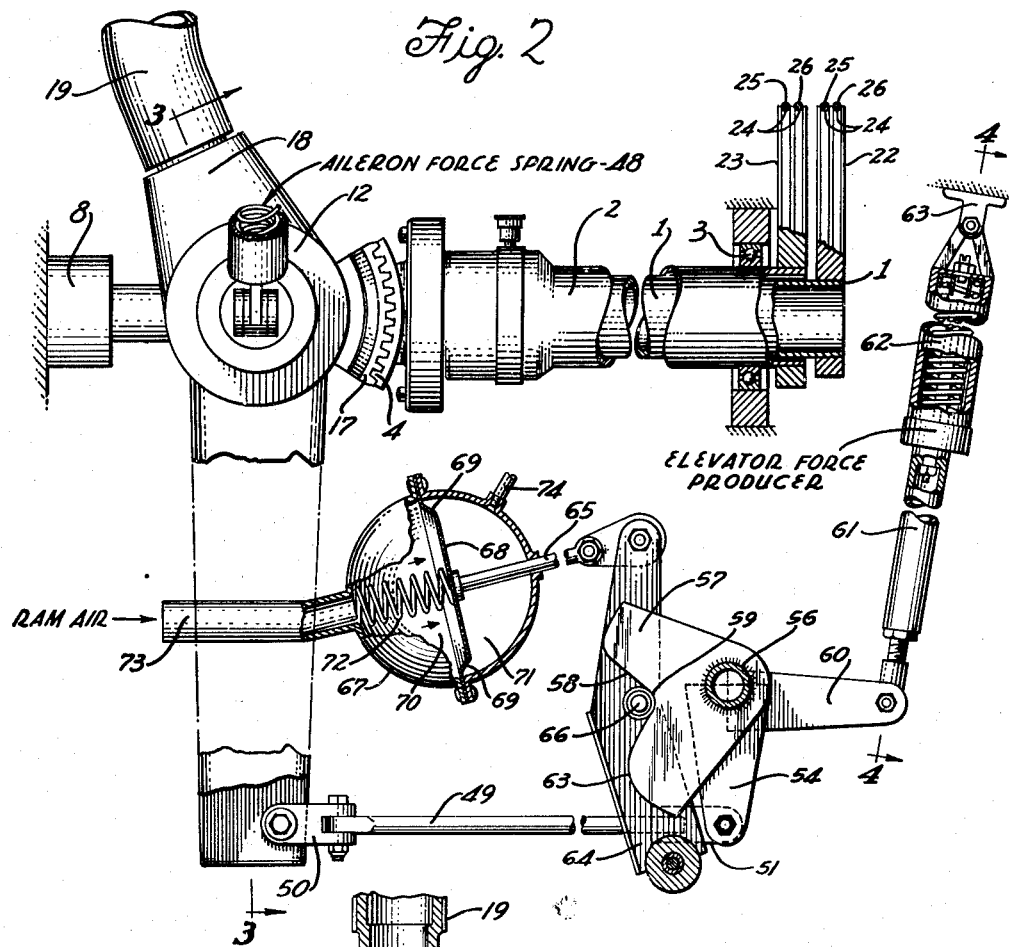
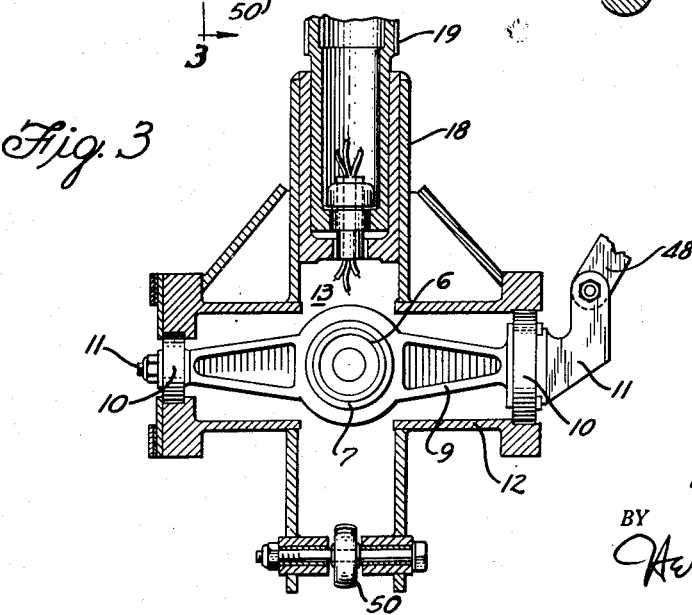
INVENTOR.
IRVING L. ASHKENAS
BY
Herbert E. Metcalf
Attorney July 20, 1954        I. L. ASHKENAS        2,684,215
STICK FORCE MECHANISM Filed Aug. 29, 1949                                    3 Sheets-Sheet 3

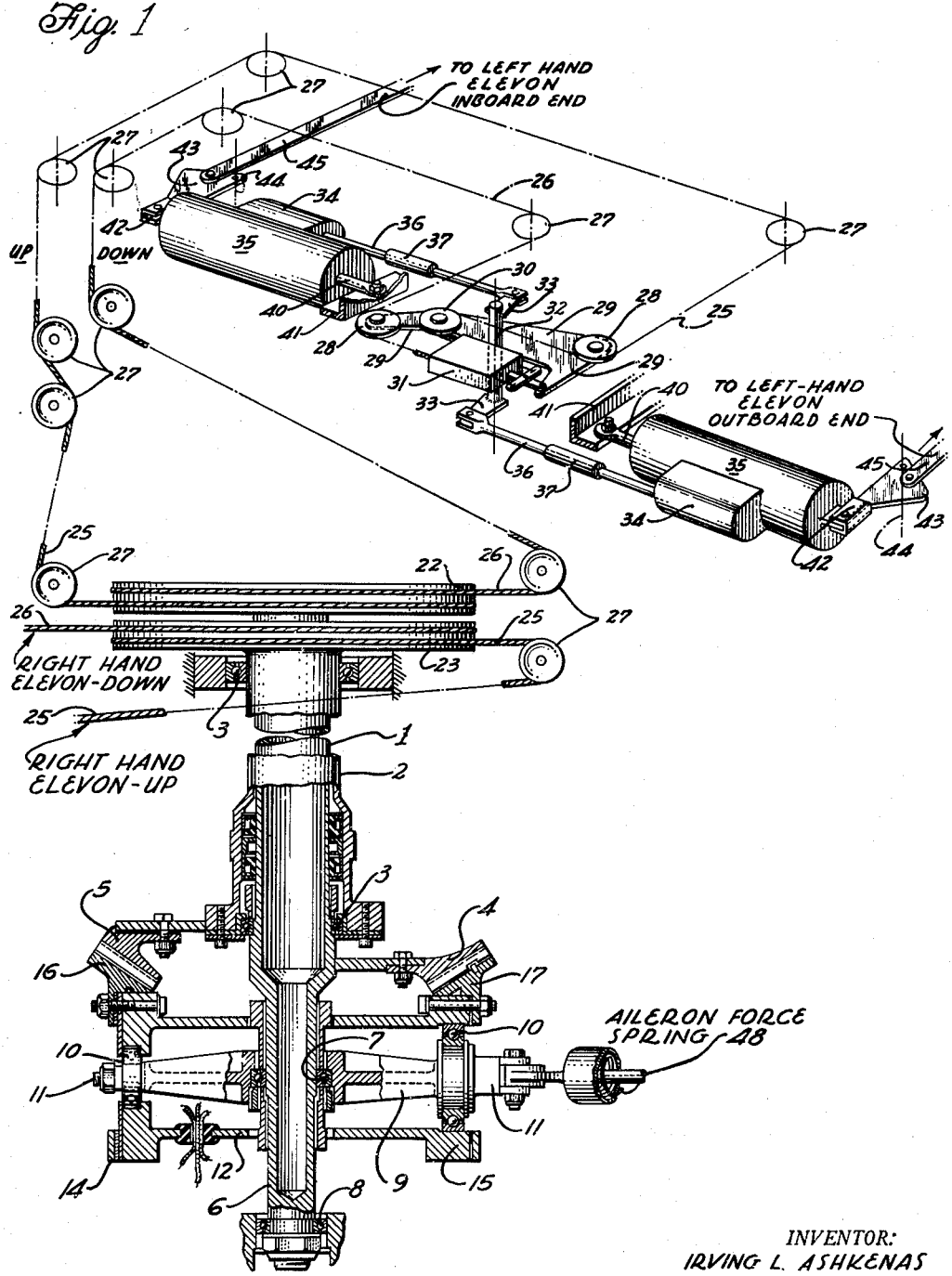

INVENTOR:
IRVING L. ASHKENAS

BY Herbert E. Metcalf
Attorney

Patented July 20, 1954

2,684,215

UNITED STATES PATENT OFFICE 2,684,215

STICK FORCE MECHANISM

Irving L. Ashkenas, Los Angeles, Calif., assignor to Northrop Aircraft, Inc., Hawthorne, Calif., a corporation of California Application August 29, 1949, Serial No. 113,008

19 Claims. (Cl. 244—83)

This invention relates to airplane control systems, and more particularly, to an improved means for applying synthetic feed-back forces to the pilot's control elements in an airplane employing power-operated control surfaces.

In airplanes equipped with a conventional attitude control system, a pilot's column or control stick is connected to move the elevator and aileron surfaces by direct-connected systems of cables and lever arms, for longitudinal and lateral control, respectively. Similarly, pilot's rudder pedals are usually connected to rudder surfaces, for directional control. In such cases, aerodynamic forces applied to the control surfaces are fed directly back to the pilot through the control stick, for example, these stick forces providing what is termed "feed-back." Feed-back forces are very important and desirable to the pilot in flying the airplane.

The control surfaces of large airplanes have correspondingly large areas and are required to withstand heavy air loads. In order to move these large surfaces for proper control, equally high pilot-initiated forces are required. Such forces become highly impractical if not impossible to achieve manually.

For this reason, and to obtain an irreversible control system wherein interaction between the control surfaces and control stick is eliminated, the use of large control surfaces has led to full power control systems. In a full power operated control system the force required to be exerted by the pilot is very small as compared to the power required to move the surface, and under such conditions the piloting movements result in signals rather than forces, these signals being used to control the applied power. Such a full-powered control has been accomplished as has been shown, described, and claimed in the copending application of Feeney, Serial No. 23,567, filed April 27, 1948.

In addition to providing very low control stick forces, a full power control system eliminates all feed-back from the attitude control surfaces, thereby giving the pilot no indication of the position of the control surfaces or the loads the airplane is taking. In consequence, the pilot can easily and unwittingly apply excessive load factors on the airplane, especially at high speed, due to excessive movement of the control surfaces.

To re-establish a sense of feel to the controls, various devices producing a so-called "synthetic" feel have been designed. One means of accomplishing this is to introduce into the control system a control-stick force derived from the dynamic pressure of the airstream passing the airplane. This force is first obtained in a casing containing a bellows-like diaphragm, opposite sides of which are exposed to differential air pressure. The resultant force acting on the diaphragm is taken by a rod or shaft attached to the diaphragm and is applied to the pilot's control column or stick through a system of levers and links which produce a moment tending to center the stick at a predetermined position at or near its neutral position. When dynamic air pressure is introduced on one side of the diaphragm and static air pressure is maintained on the opposite side, the force resisted by the bellows shaft will vary substantially as the square of the air-stream velocity. The shaft force then appears as a control stick force which varies substantially linearly with degree of control stick displacement from neutral, within the range normally covered by an airplane control stick.

In addition, in airplanes employing a device coupled to a control stick to provide an aerodynamic feel when moved in attitude controlling directions, it is also customary to additionally provide the stick with a cooperating, fixed type stick centering and neutralizing force producer, such as a centering spring, for example, so that centering forces will still be present on the stick in the absence of aerodynamic forces, such as when the airplane is on the ground. In flight, the total force on the control stick, at any position, is merely the resultant of two separate forces, i. e., the centering spring force and the force produced by the aerodynamic feel device.

In an airplane embodying such a control system, the stick force produced by airspeed can be made as high as desired by increasing the diameter of the bellows casing, which increases the diaphragm area upon which the air pressure is acting. If the airplane is relatively large, or if the force so desired does not exceed a certain value, the size of the bellows casing can be kept within practical limits. However, when the airplane is relatively small, or designed for high speeds naturally requiring high stick forces, the problem of finding a large enough space for this force producer becomes quite critical. Of course, the bellows linkage could be so geared that only a small force acting through a relatively great distance would produce the same amount of work as a larger force acting through a relatively short distance, but the total bellows volume would remain the same in either case.

It is therefore an object of this invention to provide an improved means of preventing the pilot from inadvertently overloading an elevator, or other airplane control surface under full powered operation of the surface by the pilot, wherein space limitations for installing such means are overcome.

Furthermore, the various control surfaces of every airplane are required to move through a certain range of travel in order to provide effective control of the airplane at all speeds and under all flight conditions. The elevator surfaces, in particular, in most airplanes require a large travel or swing in order to provide satisfactory control characteristics at landing speed. Thus it would be difficult to attempt any substantial reduction in length of stroke of the airspeed bellows, linearly linked to the control stick, to conserve space, and at the same time permit sufficient range of surface motion. Accordingly, it is another object of the present invention to automatically regulate the value of an aerodynamically produced synthetic feel force applied to a pilot's control element in an airplane, in order that the applied force will increase faster at relatively small control surface displacements, with a given bellows volume, than in devices heretofore proposed, while still having sufficient stroke length to permit the normal range of surface travel and providing satisfactory stick force variation with surface displacement at any speed within the normal limits of the airplane.

This invention possesses numerous other objects and features of advantage, which will be specifically pointed out or noted in the course of the detailed description forming a part of this specification, but the invention is not limited to the specific apparatus disclosed herein, since other forms may be adopted within the scope of the appended claims.

In broad terms, the present invention comprises a synthetic force producer connected to an airplane control column or stick by a mechanism giving a reverse-gradient relation between the synthetic stick force and stick displacement. The produced force is preferably allowed to act through a greater distance during a given increment of control element displacement near its neutral position than during an equal increment of displacement near the maximum control element position from neutral. In other word, the curve representing this produced force slopes upwardly during initial stick displacement and downwardly at a predetermined point thereafter. Thus, more work is accomplished by the produced force during initial stick displacement, and therefore a higher aerodynamic stick force is produced at some intermediate stick and surface position than at the maximum stick position. Elastic stick centering means is used in combination with the aerodynamic force producer to give adequate resultant stick force at maximum stick and surface deflections.

My invention may be more readily understood by reference to the accompanying drawings, wherein:

Figure 1 is a perspective diagrammatic view, partially top sectional, showing a control stick system as connected to operate the elevon surfaces of an airplane with full auxiliary power, the cable connections and operating motors of only one elevon being shown.

Figure 2 is a side view, partly in section and partly diagrammatic, of the control stick assembly in Figure 1, showing the stick-force producer of the present invention connected to the elevator control portion of the control stick.

Figure 3 is a cross-sectional view showing the control stick attachments, taken as indicated by the broken line 3—3 in Figure 2.

Figure 4:
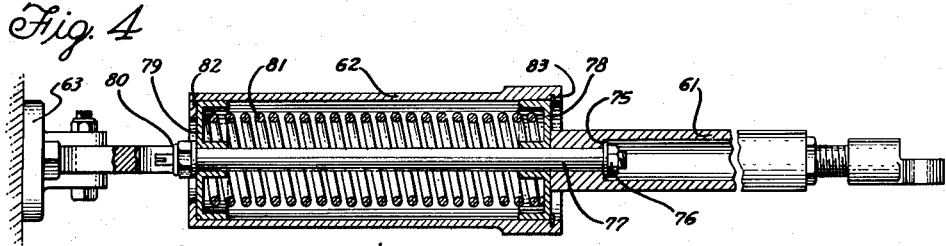
Figure 4 is a longitudinal section view of a restoring spring, taken as indicated by broken line 4—4 in Figure 2.

Referring first to Figures 1 and 2, a pair of concentric torque tubes 1 and 2 are mounted for independent rotation on a fore-and-aft axis in the airplane on tube bearings 3. The inner tube 1 extends beyond the forward end of the outer tube 2 and carries a laterally extending inner tube gear sector 4, and the forward end of outer tube 2 is provided with a similar outer tube gear sector 5 extending laterally opposite the inner tube gear sector 4.

The inner tube 1 is extended forwardly to form a stub shaft 6 of smaller diameter than the inner tube 1 and a stick bearing 7 is mounted on the stub shaft 6 for free rotation thereon. The forward end of stub shaft 6 rotates in a stub shaft bearing 8 attached to the airframe. As shown in Figure 3, a cross shaft 9, normally horizontal, is mounted on stick bearing 7 and shaft end bearings 10, 10 are attached to cross shaft 9 by opposite cross shaft pins 11, the axes of which are substantially in a horizontal plane perpendicular to and intersecting the center line of the stub shaft 6. A stick yoke 12 is rotatably mounted around the cross shaft 9 by means of the shaft end bearings 10. This yoke 12 also encircles the stub shaft 6, with a space 13 provided to permit a rotation of the yoke 12 on shaft bearings 10 of about 45° or more. Thus, the yoke 12 when assembled can rotate in a transverse vertical plane on stick bearing 7 and in a fore-and-aft vertical plane on shaft bearings 10 either with single or combined rotations.

Opposite sides 14 and 15 of the yoke 12 near the ends of the cross shaft 9 are respectively fixed to an outer tube pinion 16 and an inner tube pinion 17, these pinions meshing respectively with the outer tube gear sector 5 and the inner tube gear sector 4.

The upper part of the yoke 12 around the cross shaft 9 and stub shaft 6 forms a socket 18 into which is pressed and locked a pilot's control stick 19.

The aft ends of the inner and outer torque tubes 1 and 2 are respectively connected to elevon cable quadrants 22 and 23 provided with cable grooves 24 in their arcuate surfaces. An elevon up cable 25 and an elevon down cable 26 are each attached at opposite ends of each quadrant cable groove 24 and, folowing one pair of cables as shown for the left-hand elevon control, lead over cable pulleys 27 to pass around lever pulleys 28 mounted on the end of a valve control lever 29. The elevon up cable 25 passes around an idler pulley 30 also mounted on control lever 29 and then terminates in a tension regulator 31 mounted on control lever 29. The elevon down cable 26 enters the tension regulator directly from the opposite lever pulley.

Control lever 29 is mounted on a lever shaft 32 having top and bottom valve arms 33, each connected to operate a hydraulic servo valve spool (not shown) in a servo valve casing 34 attached to a hydraulic actuating cylinder 35, through a spring rod 36 having a two-way spring (not shown) enclosed in a spring casing 37.

As both hydraulic motors are alike except for being reversed in position, the identical parts of each will be given identical numbers and the connections of only one motor will be described.

An actuating piston rod 40 attached to a piston (not shown) inside the hydraulic actuating cylinder 35 is rotatably attached to the airframe by a rod bracket 41 to extend substantially parallel to spring rod 36. The hydraulic actuating cylinder 35 is attached by cylinder bracket 42 to a bellcrank 43 mounted to rotate on axis 44, this bellcrank being connected by link 45 extending beyond the airframe to rotatably connect with the elevon (not shown) beneath the axis of rotation thereof. It will be noted that the two motors are connected through the elevon structure. The type of full power control surface operating system described briefly herein is more fully shown, described and claimed in the copending application of Feeney, Serial No. 283,208, filed April 19, 1952.

The operation of the controls so far described and without considering the elevator centralizing system later to be described, is as follows:

The stick 19, for example, when moved aft without lateral motion thereof, rotates both pinions 16 and 17 in the same direction, and due to the tooth mesh with the respective inner and outer tube gear sectors 4 and 5 will rotate the attached torque tubes in opposite directions to actuate the elevon up cables from both quadrants 22 and 23.

These cables then through control lever 29, valve arms 33 and spring rods 36 will move the spools in each hydraulic valve casing 34 to apply hydraulic fluid under pressure to the proper side of the hydraulic actuating piston to move the actuating cylinders in a direction to move the elevons on both sides of the airplane center line upwardly. As the elevons move, however, they move the actuating cylinders in the same direction as the original spool movement, until the flow to the actuating cylinder is shut off. A similar action takes place when the stick is moved forward to actuate the elevon down cables, whereupon the elevon will be moved downwardly. As the actuating cylinders and valves are moved with the surface, and the spool is moved only by the control stick, the surfaces follow all stick movements, move upwardly or downwardly in accordance with the amount of stick movement, but transmit no significant air loads to the stick as the only connection between the surfaces and the control system is by way of the spool friction, which is, of course, negligible as compared even to friction forces in the system.

As two actuating cylinders are directly connected together through the elevon, it is desirable that one valve of each pair of cylinders remain operable if the other valve should jam; consequently, the spring rods 36 are provided so that the rod attached to operate the jammed valve can elongate or shorten to permit operation of the other valve. Normally, spring rods 36 operate as solid rods as far as valve operation is concerned.

Returning to the description of stick operation, when the stick 19 is rocked laterally, the pinion on one side will be moved downwardly and the pinion on the other side will be moved upwardly, carrying the gear sectors with them, thus rotating both torque tubes 1 and 2 together and in the same direction. This rotation will cause the quadrants to move together, thereby operating the up cable to one pair of hydraulic motors, and the down cable to the other pair of hydraulic motors, the result being to move one elevon up and the other elevon down for roll control.

As both elevation and roll control stick motions can take place simultaneously, the corresponding movements of the elevons take place simultaneously and full control in elevation and roll is obtained. This type of stick mixer is shown, described, and claimed in a copending application of Feeney and Pierce, Serial No. 77,592, filed February 21, 1949.

Stick centralizing forces are applied in aileron movements of the stick by a two-way aileron centralizing spring assembly 48 extending from one end of the cross shaft 9 to the airframe. In the system shown, these forces are not adjustable in strength or in application point.

Centering forces are applied to the stick in elevation directions through a push rod 49 rotatably connected to the lower part of the stick yoke 12 under the stub shaft 6 by a universal fitting 50 and extending aft to similarly connect to a spoke 54 by means of a second universal fitting 51. Spoke 54 is attached to a support shaft 56, mounted on bearings on each side of torque tubes 1 and 2 with the support shaft rotational axis crossing the protected rotational axis of torque tubes 1 and 2 at a right angle.

A cam sector 57 is mounted on one end of support shaft 56 with a cam surface 58 facing forward, the cam having a central indent portion 59 of minimum radius and side portions of greater radii. Opposite the indent 59 of the cam, the support shaft carries a force lever 60 rotatably connected to a spring operating rod 61 entering an elevator force producer cylinder 62 attached to the airframe by a support 63 and held in a substantially vertical plane.

One satisfactory elastic centering force producing mechanism is shown in Figure 4 and will be next described.

Spring operating rod 61 is hollow, and is provided with an end shoulder 75 which bears against an internal nut 76 on one end of a tension rod 77. Tension rod 77 passes through one spring cap 78 and then through a second and opposite spring cap 79 to terminate in a second rod nut 80. A compression spring 81, preferably preloaded, is placed between spring caps 78 and 79, and caps 78 and 79 are movable within the force producer cylinder 62, being held from leaving the cylinder at one end by cylinder end 82 and at the other end by split ring 83. The compression spring 81 is the elevator force producer. Spring operating rod 61 bears against, but is not attached to, spring cap 78.

Spring operating rod 61 acting under the control of compression spring 81 is connected to the control stick 19 through force lever 60, support shaft 56, spoke 54, push rod 49, and stick yoke 12, to hold the stick in a predetermined neutral position which normally is the position from which the attached control surfaces are moved for aerodynamic elevation control of the airplane. Thereafter, movement of the control stick either fore or aft will compress compression spring 81 to supply a restoring or centralizing force to the stick, acting as follows.

When force lever 60 is moved toward the force producer cylinder 62, spring operating rod 61 bears against cap 78 to compress the compression spring, as the opposite cap 79 cannot move because the cylinder is fixed to the airframe. In this case, spring operating rod 61 slides over tension rod 77.

In the reverse direction, when force lever 60 is moved away from the force producer cylinder 62, shoulder 75 on spring operating rod 61 picks up internal nut 76 on tension rod 77, moves the tension rod 77 and opposite spring cap 79 to again compress the compression spring 81 to supply the restoring force.

In front of cam sector 57 a cam lever 64 is rotatably attached below to the airframe, and extends upwardly to rotatably connect to a bellows rod 65 extending forwardly. Cam lever 64, between its ends, also carries a cam follower 66 rolling on cam surface 58 so that pressure on bellows rod 65 directed aft will force the cam follower 66 into the central indent portion 59 of cam surface 58 and thus rotate support shaft 56 if the cam follower is not in the indent portion.

In flight, the force on bellows rod 65 is supplied by the dynamic air flow by means of a bellows casing 67 preferably spherical and containing a diaphragm 68 attached to the casing 67 by flexible edges 69, this diaphragm dividing the casing into a pressure chamber 70 and a static chamber 71. Bellows rod 65 extends through the casing 67, and diaphragm 68 is attached at a right angle thereto inside the casing 67. A light diaphragm spring 72 presses the diaphragm aft to insure contact of follower 66 with cam surface 58 when the airplane is not in flight. Pressure chamber 70 is connected by ram air tube 73 to an air scoop, for example, so that pressures in accordance with air speed can be produced in pressure chamber 70. The static chamber 71 is connected by static line 74 to a position of static or negative pressure on the outside of the airplane. The bellows action applies a synthetic feel to the control stick when moved in elevation direction.

The relation of force lever 60 to cam sector 57 is such that when the spring operating rod 61 is not compressing compression spring 81 in either direction, the cam follower 66 will be at the innermost penetration in the indent portion 59, with the force applied by the cam follower when the airplane is in flight applied radially to the support shaft 56. Thus, when the airplane is not in flight, the centering forces are applied almost entirely from the elevator force producer 81, a very small amount being supplied by the diaphragm spring 72 which merely keeps the cam follower in the indent when the airplane is at rest. In flight, however, the centering forces are supplied both from the force producer 81 and from the bellows as the cam surface 58 is rotated, the latter force providing the synthetic feel in elevation control when the stick is moved for that type of control.

It should be noted, however, that it may be desired in some airplanes to have the compression spring 81, alone, tending to establish a certain zero-force stick position slightly different from the neutral position as determined by the bellows linkage, alone. Thus it is not mandatory in the present invention for the elevator force producer and bellows linkage to have a common neutral.

The contour of cam surface 58 determines how the stick force caused by forward speed of the airplane varies with degree of stick displacement from neutral. The term "stick force" is more precisely defined as that force which is exactly balanced by the pilot at the center of the stick hand grip to hold the stick in equilibrium, at any given position, against the resultant torque exerted about the stick pivot by the force producer 81 and the bellows linkage. The bellows rod 65, pushing to the rear, will exert a turning moment on support shaft 56 by reason of the moment arm of the force produced by the cam follower 66 normal to the cam surface 58. This normal force is the only force transmitted to cam sector 57, since cam follower 66 is a roller turning on a lubricated bearing.

In the neutral position as shown in Figure 2, this moment arm is zero and hence no force is applied to the control stick from the bellows linkage. However, when support shaft 56 is rotated, cam follower 66 will be moved out of the cam indent 59 and brought to bear against one of the sloping side surfaces so that a moment arm greater than zero is present to turn the force appearing in cam lever 64 into torque on support shaft 56. The more slanting the cam surface 58 becomes, i. e., the closer it approaches being radially aligned with the rotational axis of support shaft 56, the greater will be that moment arm, resulting in a higher torque. The normal force on the cam surface 58 will also increase as the surface line approaches a radius, since the normal force is required to exert a balancing torque on cam lever 64 equal and opposite to that exerted by bellows rod 65, and the moment arm of the normal force about the pivot point of cam lever 64 is decreasing under this condition.

Thus it is seen that as cam surface 58 approaches a radius arm of cam sector 57, resultant stick force will increase, and as the cam surface approaches an arc centered at the axis of support shaft 56, resultant stick force will decrease. It will be noted that as the control stick 19 is moved aft from neutral cam sector 57 will be rotated clockwise, and as this motion continues, cam follower 66 will be riding over the convex portion 63 near the lower end of cam surface 58. This means that the stick force obtained from the bellows linkage is decreasing, as described above, after having reached a maximum while at the nearly straight line portion between the cam indent 59 and the lower convex portion 63 of the cam surface.

The main purpose of this reverse-gradient force linkage is to extract a larger amount of mechanical work from the force bellows during the initial control stick displacement from neutral than during an equal subsequent displacement near the end of its travel. For example, three fourths of the bellows work capacity may be accomplished during movement of the control stick from neutral to one half its normal aft deflection, and only one fourth during control stick movement from the halfway point to full deflection. Reasons for doing this will now be shown.

Figure 5:
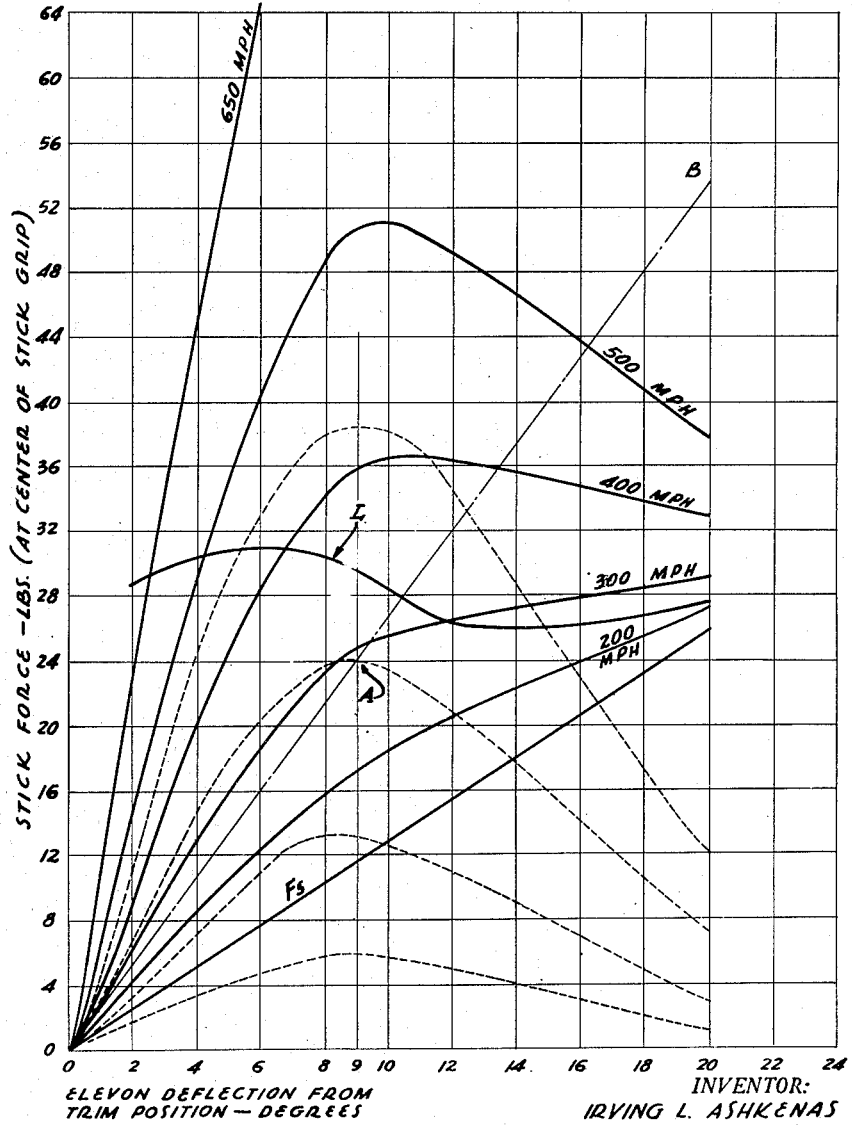
Figure 5 is a graph of control stick force and surface deflection, at several airspeeds, showing characteristics of a control system embodying one form of the force producer system in Figure 2.

In Figure 5, taking an example of a high speed airplane embodying the above-described cam in its control system, stick centering forces are plotted against elevon surface positions from 0° (neutral) to approximately 20° aft. For the control system described in this specification, the elevons are connected to move substantially linearly with control stick movement. Since the total elevon surface range of movement in degrees is slightly less than the angular range of stick displacement, the terms "surface position" and "stick position' are not synonymous, but they are directly proportional.

The straight line Fs in Figure 5 shows the stick force resulting from the displacement of the elevator spring force producer, 81, alone. At zero airspeed, this is the only force acting on the control stick 19, neglecting friction and the insignificant force resultant from the diaphragm spring 72. This provides the desired stick centering forces when the airplane is on the ground. The solid curved lines proceeding from the vertex give the total resultant stick forces at the indicated airspeeds of 200 M. P. H., 300 M. P. H., 400 M. P. H., 500 M. P. M., and 650 M. P. H., the total force increasing with higher speeds due to the bellows mechanism as described before.

Also shown in Figure 5 is the stick force for each of the above speeds which is provided by the airspeed bellows alone, i. e., the dotted curved lines. The force represented by each of these dotted lines, at any surface position, when added to the centering spring force as represented by the line Fs, at that same surface position, results in the corresponding solid curved line.

From this graph, it may be seen that the bellows force varies first in an increasing fashion and then in a decreasing fashion as surface deflection increases, this force reaching a maximum at about 9° upward travel For surface positions above 9°, the bellows force at any airspeed decreases in accordance with the shape of the cam surface 58 at its lower convex portion 63. However, it is important to note that the resultant stick force does not reach a maximum peak at any combination of conditions within the safe operating limits of the airplane. This is explained as follows:

Located on each resultant stick force curve is a point determined by aerodynamics which shows the elevon surface positions at the most forward location of the airplane center of gravity, at each respective speed, which will produce an applied load factor of 8 on the airplane, or, in other words, a normal acceleration of 8 g's. These points are connected by the load limit line L. If this value of 8 represents the limit load factor to be applied to the aircraft structure, it is thus seen that none of the conditions shown above the line L will be encountered in normal flight. Therefore, a constantly increasing stick force with increasing surface deflection is provided at all airspeeds, throughout the safe operating limits of the airplane.

That satisfactory stick force characteristics are provided at low airspeeds is shown by the fact that the elevator force producer 81 furnishes the greater part of the resultant stick force at such speeds. Thus, the control stick 19 can be displaced sufficiently aft to place the cam follower 66 on the lower convex portion 63 of the cam surface 58 without causing resultant stick force to decrease.

The advantage of the non-linear force relation of this invention when used to transmit a force derived from airspeed, is clearly shown by referring to the bellows force curve establishing the resulting stick force curve at 400 M. P. H. The stick force produced by the bellows alone is approximately 24 pounds when the elevon is 9° up at this speed, as indicated at point A in Figure 5. The volume of the bellows casing may be represented by the area under the dotted curve passing through this point. If a linear relationship existed between stick force and elevon displacement, and this same point A is required to be obtained, the bellows force line at this same airspeed would be the straight center-line through the vertex and point A, which intersects the 20° surface line at point B. The required volume for the bellows casing then is represented by the area under the straight line from the vertex to point B.

Since the ratio of these two areas mentioned is equal to the volume ratio of a bellows which is connected to give linear stick force variance as compared to the bellows mechanism of the present invention, it is evident that a bellows casing of approximately one-half the volume of previously-used devices is required by the present method, for this given curve. Of course, this same feature presents itself at all speeds and surface positions.

When the control stick 19 is moved forward from neutral, the cam sector 57 in Figure 2 will be rotated counterclockwise and the cam follower 66 will ride along the upper side slope of the cam surface 58. The range of control surface movement in a direction downward from neutral is generally not as great as the upward range, for longitudinal control; therefore, the cam surface 58 need not provide for as much angular travel above the central indent 59 as it does below. The upper side slope will be designed to provide stick forces in the opposite direction from those shown in Figure 5, but the method will be the same.

The cam design and contour can be modified to give any desired relation between stick force and surface deflection. Forward stick forces are entirely independent from aft stick forces, and can be made to differ however desired, to provide proper airplane handling characteristics.

This invention is also useful in applying a control stick force produced by means other than an airspeed bellows, such as an acceleration-produced force, for example. Furthermore, it is obvious that the present invention can be successfully applied to airplanes incorporating merely a power boost or auxiliary power control system, wherein a part of the force necessary to produce control surface movement is supplied by the pilot, as well as to full power operated control systems. It is also obvious that other non-linear linkages, well known in the field of mechanics, can be adapted to substitute for the multiple-contour cam assembly shown and described herein, such as a pair of mating elliptical gears, for example.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is, therefore, claimed in any of its forms or modifications within the legitimate and valid scope of the appended claims.

What is claimed is:

1. In an airplane having a control surface linked to be moved by a pilot's control element, elastic centering means connected to said pilot's control element to tend to center said control element to substantially neutralize said control surface, force transmitting means having a member adapted to be moved by an external force, and means connecting said member non-linearly to said control element, said connecting means comprising a pivotally mounted support member, linkage means connected between said support member and said pilot's control element to rotate said support member substantially linearly as said control element is moved in a direction to move said control surface, a cam sector attached to rotate with said support member and having a cam surface on its perimeter, a cam follower positioned to ride on said cam surface, and additional means connecting said movable member to said cam follower to urge said cam follower against said cam surface in accordance with said force, said cam surface having a contour providing a predetermined non-linear motion between said movable member and said pilot's control element on at least one side of said center.

2. In an airplane having a control surface linked to be moved by a pilot's control element, elastic centering means connected to said pilot's control element to tend to center said control element to substantially neutralize said control surface, force transmitting means having a member adapted to be moved by an external force, and means connecting said member non-linearly to said control element, said connecting means comprising a pivotally mounted support member, linkage means connected between said support member and said pilot's control element to rotate said support member substantially linearly as said control element is moved in a direction to move said control surface, a cam sector attached to rotate with said support member and having a cam surface on its perimeter, a cam follower positioned to ride on said cam surface, and additional means connecting said movable member to said cam follower to urge said cam follower against said cam surface in accordance with said force, said cam surface having a contour providing a predetermined non-linear motion between said movable member and said pilot's control element on at least one side of said center.

3. In an airplane having a control surface linked to be moved by a pilot's control element, elastic centering means connected to said pilot's control element to tend to center said control element to substantially neutralize said control surface, force transmitting means having a member adapted to be moved by an external force, and means connecting said member non-linearly to said control element, said connecting means comprising a pivotally mounted support member, linkage means connected between said support member and said pilot's control element to rotate said support member substantially linearly as said control element is moved in a direction to move said control surface, a cam sector attached to rotate with said support member and having a cam surface on its perimeter, a cam follower positioned to ride on said cam surface, and means connecting said movable member to urge said cam follower against said cam surface in accordance with said force, said cam surface comprising a central indent portion determining the maximum inward position of said cam follower and positioned to be occupied by said follower at said center position of said pilot's control element, and a curved side portion on each side of said indent portion contoured to produce a predetermined non-linear relationship between movement of said movable member and said pilot's control element.

4. In an airplane having a control surface linked to be moved by a pilot's control element, elastic centering means connected to said pilot's control element to tend to center said control element to substantially neutralize said control surface, force transmitting means having a member adapted to be moved by an external force, and means connecting said member non-linearly to said control element, said connecting means comprising a pivotally mounted support member, linkage means connected between said support member and said pilot's control element to rotate said support member substantially linearly as said control element is moved in a direction to move said control surface, a cam sector attached to rotate with said support member and having a cam surface on its perimeter, a cam follower positioned to ride on said cam surface, and means connecting said movable member to urge said cam follower against said cam surface in accordance with said force, said cam surface comprising a central indent portion determining the maximum inward position of said cam follower and positioned to be occupied by said follower at said center position of said pilot's control element, and a curved side portion on one side of said indent portion contoured to produce an increasing rate of movement of said movable member against said force as said pilot's control element is moved through a first distance from said center and a decreasing rate of movement of said movable member against said force as said pilot's control element is moved through a subsequent distance from said center, whereby a resultant control element feel-back force is provided by said elastic centering means and said force producing means, said feel-back force increasing with degree of movement of said pilot's control element from said center throughout the safe flight operating range of said control surface.

5. In an airplane having a control surface connected to be moved by a pilot's control element, force transmitting means, and a positive non-linear connecting linkage disposed between said force transmitting means and said control element to provide a centering force on said control element to substantially neutralize said control surface at a non-deflected position, said connecting linkage comprising means for moving said force transmitting means, in opposition to a force therein, at a relatively high rate and then at a decreasing rate as said control element is uniformly moved away from center within the operating range of said control element.

6. Apparatus in accordance with claim 5 wherein said force transmitting means is actuated by the difference between the dynamic air pressure and the static air pressure conditions existing over the surface of said airplane.

7. In an airplane having a control surface connected to be moved by a pilot's control element, force transmitting means, and means operatively connecting said force transmitting means to said pilot's control element to center it to substantially neutralize said control surface at a non-deflected position, said connecting means including a cam driven by said control element, an actuating surface on said cam, and a follower riding on said surface and drivingly connected to said force transmitting means, said surface having a contour providing a predetermined non-linear motion between said force transmitting means and said pilot's control element on at least one side of said center within the operating range of said control element.

8. Apparatus in accordance with claim 7 wherein said force producing means is actuated by the difference between the dynamic air pressure and static air pressure conditions existing over the surface of said airplane, and wherein elastic centering means is additionally connected to exert a centering effect on said pilot's control element irrespective of air speed.

9. Apparatus in accordance with claim 7 wherein said cam is asymmetrical about a neutral point corresponding with said pilot's control element center, whereby centering forces exerted on said pilot's control element on one side of said center bear a different relationship to the position of said pilot's control element than centering forces exerted on the opposite side of said center.

10. In an airplane including a control surface therefor and a control member adapted to be moved from a neutral position by the pilot for deflecting said control surface, force transmitting means, and means for non-linearly connecting said force transmitting means to said control member to bias it to its neutral position, said connecting means including a cam driven by said control member, a follower driven by said cam and drivingly connected to said force transmitting means, first means on said cam for producing a relatively high rate of movement of said follower against said force producing means during a first distance movement of said control member from said neutral position, and second means on said cam for reducing said rate of movement of said follower during a subsequent distance movement of said control member from said neutral position, whereby a reverse gradient control member force relationship is provided by said non-linear connecting means.

11. In an airplane including a control surface therefor and a control member adapted to be moved from a neutral position by the pilot for deflecting said control surface, force transmitting means having a movable member, and means for operatively connecting said movable member to said control member to bias it to its neutral position, said connecting means including a non-linear linkage having means for producing a relatively high rate of movement of said movable member against said force as said control member is steadily moved through a first distance from said neutral position and means for producing a decreasing rate of movement of said movable member against said force as said control member is steadily moved through a subsequent distance from said neutral position within the operating range of said control member.

12. In an airplane including a control surface therefore and a control member adapted to be moved from a neutral position by the pilot for deflecting said control surface, force transmitting means having a movable member, and connecting means comprising a pivotally mounted support member, a linkage connected between said control member and said support member to rotate said support member substantially linearly as said control member is moved in a direction to move said control surface, a cam sector attached to rotate with said support member and having a cam surface on its perimeter, a cam follower positioned to ride on said cam surface, and follower support means connected to said movable member to urge said cam follower against said cam surface in accordance with the amount of said force, said cam surface comprising a central indent portion determining the maximum inward position of said cam follower and positioned to be occupied by said follower at said neutral position of said control member, and a curved side portion on one side of said indent portion contoured to produce an increasing rate of movement of said movable member against said force as said control member is moved through a first distance from said neutral position and a decreasing rate of movement of said movable member against said force as said control member is moved through a subsequent distance from said neutral position.

13. In an aircraft attitude control system, an attitude control surface, a pilot's control element connected to deflect said surface from a neutral position by power-operated means, means for generating a force, and means for applying said force to said control element in reverse gradient proportion to the deflection of said surface away from said neutral position within the normal operating range of said surface, as airspeed remains constant.

14. In an aircraft attitude control system, an attitude control surface, a pilot's control element connected to deflect said surface from a neutral position, means for generating a force varying as a function of airspeed, and means for applying said force to said control element in reverse gradient relation to the deflection of said surface away from said neutral position within the normal operating range of said control element, as said airspeed remains constant.

15. In an aircraft attitude control system, an attitude control surface, a pilot's control element connected to deflect said surface from a neutral position, means for generating a force varying as a function of airspeed, means for applying said force to said control element in reverse gradient relation to the deflection of said surface away from said neutral position within the normal operating range of said control element, means for generating a second force directly proportional to the distance of said surface from said neutral position, and means for applying said second force to said control element independently of and simultaneously with the first force, whereby there is provided a constantly increasing total force on said control element relative to deflection thereof from neutral, regardless of airspeed.

16. In an airplane having a control surface to be moved under power by movement of a rotatably mounted pilot's control element, and providing feel-back forces on said control element by means of a separate force producer, means for reducing the required work capacity of said force producer which comprises; means for substantially increasing the effective moment arm of the produced force on said control element as said control element is moved through an initial distance away from neutral, means for substantially decreasing said moment arm as movement of said control element is continued away from said neutral beyond said initial distance, and means for independently and simultaneously applying a neutralizing force to said control element in substantially direct proportion to the distance of said control element from said neutral.

17. In an airplane having a control surface connected to be moved by a pilot's control element, force transmitting means, and means operatively connecting said force transmitting means to said pilot's control element to center it to substantially neutralize said control surface at a non-deflected position, said connecting means including a cam rotatable about an axis, said cam comprising a peripheral surface having a neutral point of minimum radius from said axis, a side portion on each side of said neutral point having points of increasing radial distance from said axis, and an end portion adjacent each side portion having points approaching a constant radial distance from said axis, and a cam follower positioned to ride on said peripheral surface.

18. In an airplane having a control surface linked to be moved by a pilot's control element, constant rate elastic centering means linearly connected to said pilot's control element to tend to center said control element to substantially neutralize said control surface, force transmitting means having a member adapted to be moved by an external force, and a non-linear reverse gradient force linkage connecting said movable member to said control element and operative within the range of motion of said control element between center and maximum deflection in one direction therefrom, to move said member at first rapidly and then more slowly in a direction opposing said force as said pilot's control element is moved away from a position near said center.

19. In an airplane, a pilot's control element, a control surface linked to be moved by said pilot's control element, elastic centering means connected to said pilot's control element to tend to center said control element to substantially neutralize said control surface, airspeed-energized force transmitting means having a member adapted to be moved by a force proportional to a function of airspeed, and non-linear reverse gradient force connecting means connected between said member and said control element and operative within the normal range of said pilot's control element as said control element is moved unidirectionally on one side of said center, whereby when properly proportioned, the forces on said control element from said elastic centering means and from said reverse gradient force connecting means add in obtaining a desired control element force versus deflection relationship at all airspeeds.

References Cited in the file of this patent

UNITED STATES PATENTS

| Number | Name | Date |
| --- | --- | --- |
| 1,671,081 | Miller | May 22, 1921 |
| 2,110,622 | Fischel | Mar. 8, 1938 |
| 2,205,610 | Van Nes | June 25, 1940 |
| 2,295,159 | Child | Sept. 8, 1942 |
| 2,340,524 | Fischel | Feb. 1, 1944 |
| 2,445,343 | Tyra | July 20, 1948 |
| 2,508,883 | Knowler | May 23, 1950 |

FOREIGN PATENTS

| Number | Country | Date |
| --- | --- | --- |
| 569,290 | Great Britain | May 16, 1945 |